US007313472B2

(12) United States Patent
Schick et al.

(10) Patent No.: US 7,313,472 B2
(45) Date of Patent: Dec. 25, 2007

(54) TRACTOR POWER HOP CONTROL SYSTEM AND METHOD

(75) Inventors: Troy Eugene Schick, Cedar Falls, IA (US); Boris P. Volfson, Moline, IL (US)

(73) Assignee: Deere & Company, Moline, IL (US)

( * ) Notice: Subject to any disclaimer, the term of this patent is extended or adjusted under 35 U.S.C. 154(b) by 720 days.

(21) Appl. No.: 10/887,039

(22) Filed: Jul. 8, 2004

(65) Prior Publication Data

US 2006/0009897 A1 Jan. 12, 2006

(51) Int. Cl.
*G06F 19/00* (2006.01)
*F16H 59/34* (2006.01)

(52) U.S. Cl. .......................... 701/50; 701/86; 477/121

(58) Field of Classification Search ................. 701/50, 701/86; 477/121
See application file for complete search history.

(56) References Cited

U.S. PATENT DOCUMENTS

| | | | | |
|---|---|---|---|---|
| 4,656,986 A | | 4/1987 | Kull et al. | 123/357 |
| 4,928,652 A | | 5/1990 | Shinya et al. | 123/417 |
| 5,163,530 A | | 11/1992 | Nakamura et al. | 180/197 |
| 5,470,289 A | | 11/1995 | Pioch et al. | 477/111 |
| 5,623,410 A | * | 4/1997 | Furihata et al. | 701/37 |
| 5,819,866 A | | 10/1998 | Smith et al. | 180/197 |
| 5,906,187 A | | 5/1999 | Heuer | 123/436 |
| 6,035,827 A | | 3/2000 | Heinitz et al. | 123/436 |
| 6,273,203 B1 | * | 8/2001 | Paggi et al. | 180/89.13 |
| 6,314,342 B1 | | 11/2001 | Kramer et al. | 701/1 |
| 6,401,853 B1 | | 6/2002 | Turski et al. | 180/197 |
| 6,589,135 B2 | * | 7/2003 | Miller | 477/110 |
| 7,198,125 B2 | * | 4/2007 | Skelcher et al. | 180/89.13 |

FOREIGN PATENT DOCUMENTS

EP 0 768 455 A2 4/1997

OTHER PUBLICATIONS

Volfson, B.P. and Estrin, M., "The Slip-Stick Phenomenon in Vehicle Ride Simulation," Computers in Engineering 1983—vol. One, pp. 229-235, date unknown.

* cited by examiner

*Primary Examiner*—Yonel Beaulieu

(57) ABSTRACT

A control system performs a method for controlling pitching and bouncing of a vehicle having an engine driving wheels through a transmission, and having a fuel control unit for supplying a variable amount of fuel to the engine in response to fuel control signals generated by an engine control unit. The method includes, from front and rear acceleration signals, generating vehicle pitch and bounce signals, converting the pitch and bounce signals to RMS pitch and bounce values, generating a fuel offset value as a function of the RMS pitch and bounce values, and modifying fuel delivered to the engine as a function of the fuel offset value. The fuel offset value is operate don by a bi-linear gain function wherein negative values are multiplied by a larger gain and positive values are multiplied by a smaller gain.

20 Claims, 3 Drawing Sheets

TRACTOR POWER HOP CONTROL SYSTEM AND METHOD

FIELD OF THE INVENTION

This invention relates to a system and method for controlling power hop in a vehicle such as an agricultural tractor.

BACKGROUND OF THE INVENTION

Power hop for agricultural tractors is a well known phenomena, as described by B. P. Volfson and M. Estrin in "The Slip-Stick Phenomenon in Vehicle Ride Simulation", published by ASME "Computers in Engineering" 1983 Vol. 1. Power hop occurs most commonly with drawn implements in dry soils. Power hop can also occur on hard surfaces such as concrete or asphalt. It is believed that the power hop condition occurs when the traction force exceeds the stable limit of the tire-to-ground interface. When the traction load/pull reaches this limit, a stick-slip phenomena occurs at the tire-to-ground interface which excites the vehicle bounce and pitch natural frequencies. The resulting bounce and pitch motion is called power hop. Power hop can be pure pitch, pure bounce, or a mixture of bounce and pitch. In some cases, the bounce and pitch motions can become severe enough to cause operator discomfort, decreased implement performance, and equipment damage.

Often when power hop develops on an agricultural tractor, the traction force must be brought to zero in order to stop power hop bounce and pitch oscillations. Simply reducing the traction force on the tires may not be enough to return to stable traction after the tractor bounce and pitch resonant frequencies have been excited. An operator is often required to raise the implement or stop the tractor to stop power hop oscillations. An automatic means to reduce traction force and stop power hop bounce and pitch tractor oscillations without lowering productivity is needed.

An experienced operator may manually reduce the traction force by slowing down the tractor or raising the implement, since the traction force requirement is proportional to velocity and cut depth for many tillage applications. However, the operator has no way of knowing where to set the power level for stable traction. Usually a trial and error approach is used, causing the operator to experience power hop as field conditions vary. If the power level is set too high, the power hop condition will be present. An automatic means to lower the tractor steady state power level to maintain stable traction is needed.

Attempts have been made to control power hop by adjusting the drawbar height, tire inflation pressure, and weight/ballast distribution. For example, European patent application EP 1 022 160, published on 26 Jul. 2000 and assigned to the assignee of this Application, describes a wheel mounting disk which is intended to more accurately center a wheel and tire on a vehicle axle. However, such a wheel mounting disk has not completely eliminated road lope. These adjustments help by changing the traction limit slightly and/or by reducing the vehicle bounce and pitch motion amplitudes. However, the physical traction limit still exists, and when exceeded, the vehicle will power hop.

It has been proposed to avoid power hop by limiting the traction force of the vehicle, such as with the traction control and anti-lock bake systems available on many automobiles today. In these systems, the traction force is reduced when wheel slide is detected by a wheel speed sensor. U.S. Pat. No. 6,401,853 describes a system which detects power hop using wheel speed sensors on accelerating over-the-road trucks and limits the traction force by controlling engine torque.

However, the torsional compliance of a pneumatic agricultural tractor tire is large when compared to that of an automobile tire. For this reason, the automotive and over-the-road truck approach of measuring wheel stick-slip characteristics with a wheel speed sensor is not practical for an agricultural tractor. When stick-slip is occurring at the tire-to-ground interface, the tractor axle speed may be constant. Some other suitable means for detecting power hop on an agricultural tractor is needed.

U.S. Pat. No. 6,035,827, issued 14 Mar. 2000 to Heinitz et al., discloses a system wherein an engine speed signal is fed back to a characteristic function, and wherein an engine fuel quantity signal is operated on by an inverse transmission function to generate a compensated fuel quantity signal. However, the practicality of such a system is doubtful because it is believed to be difficult to extract the needed information from the feed back engine speed signal.

German Published, Non-Prosecuted Patent Application DE 195 37 787 A1 discloses a method for compensating bouncing oscillations. In that reference a signal expressing the wish of the driver is filtered through the use of a transmission element. The parameters of the transmission element, and thus its transmission behavior, are changed as a function of operating parameters while the internal combustion is operating. Furthermore, a subordinate rotational speed control is used for non-steady operation, which leads to a considerable number of application parameters.

U.S. Pat. No. 6,589,135, issued to Miller and assigned to the assignee of the present application, describes a proposed system an method for reducing vehicle bouncing wherein the engine power or driveline torque is varied in order to counteract vehicle pitching. However, this system did not sense both vehicle bouncing and vehicle pitching, and it was found that this system would not completely eliminate vehicle bouncing.

U.S. Pat. No. 5,819,866 is believed to describe a system for controlling pitching in a vehicle operating at transport speeds wherein pitching is detected by accelerometers.

It would be desirable to have a system which controls both vehicle bouncing and vehicle pitching in an agricultural tractor operating at low speed and heavy load conditions.

SUMMARY OF THE INVENTION

Accordingly, an object of this invention is to provide a method and system for reducing pitching and bouncing of a vehicle, such as an agricultural tractor.

A further object of the invention is to provide such a method and system which does not require tire adjusting or manipulation.

A further object of the invention is to provide such a method and system which does not require extracting information from an engine speed sensor or a wheel speed sensor.

These and other objects are achieved by the present invention, which is a method and system for controlling road lope in a vehicle having an engine driving wheels through a transmission having multiple gear ratios, and having a fuel control unit for supplying a variable amount of fuel to the engine in response to fuel control signals generated by an engine control unit. The method includes sensing vehicle acceleration with an accelerometer mounted on the vehicle and generating an acceleration signal in response to motion of the vehicle, generating time constant and torque gain values as a function of the transmission gear, generating an output torque value as a function of the acceleration signal, an engine torque, the time constant and the torque gain, and modifying fuel delivered to the engine as a function of the output torque value.

DESCRIPTION OF THE PREFERRED EMBODIMENT

Figure 1:
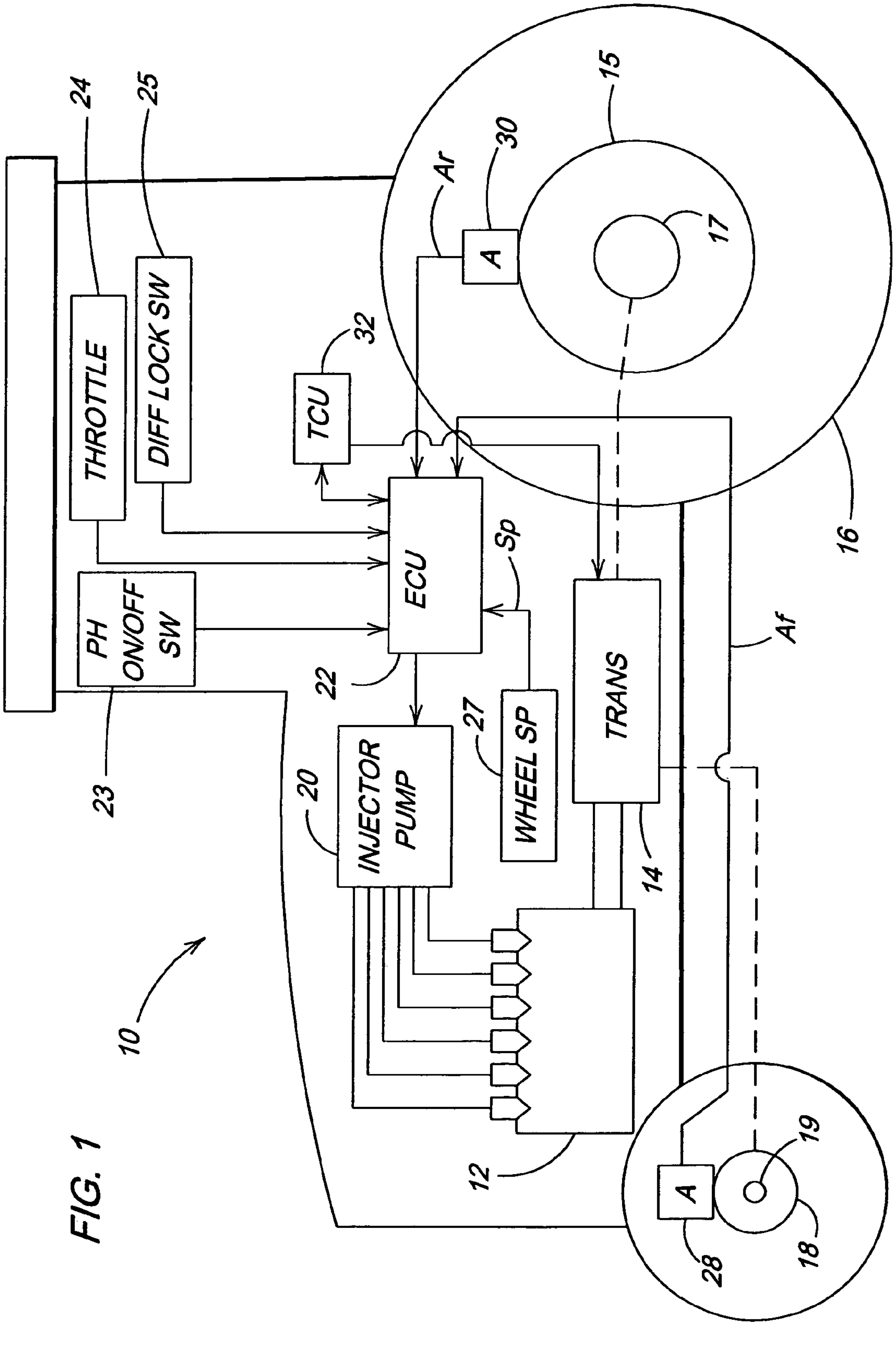
FIG. 1 is a simplified schematic block diagram of the present invention.

In FIG. 1, a vehicle 10, such as a agricultural tractor, includes an engine 12 which supplies power to a transmission 14 which has multiple gear ratios, such as a production powershift transmission. The transmission 14 drives rear wheels 15, (including tires 16) mounted on an axle 17, and selectively drives front wheels 18 mounted on a front axle 19. Engine control unit (ECU) 22, which includes an electronic governor (not shown), controls pump 20 which supplies a variable amount of fuel to the engine 12 in response to fuel control signals generated by the ECU 22.

The ECU 22, in addition to other signals it normally receives, such as a throttle signal from a conventional throttle control or speed command 24. The ECU 22 also receives a status signal from diff lock switch 26 which controls a differential lock (not shown) in the transmission 14.

A front accelerometer 28 is preferably mounted on or near the front axle 19 and provides to ECU 22 a front acceleration signal Af representing an acceleration of the portion of the tractor 10 supported above the axle 19. A rear accelerometer 30 is preferably mounted on or near the rear axle 17 and provides to ECU 22 a rear acceleration signal Ar representing an acceleration of the portion of the tractor 10 supported above the axle 17. The accelerometers 28, 30 generate analog voltages Af, Ar which will vary from a minimum voltage which represents a maximum downward acceleration to a maximum voltage which represents a maximum upward acceleration. The acceleration signals will also typically be a time varying or oscillating signal with a frequency normally ranging from approximately 1.5 to approximately 3 Hz, depending on speed, weight, tire pressure, and upon whether and what implement (not shown) may be attached to the tractor 10.

The ECU 22 also receives a vehicle speed or wheel speed signal Sp from a speed sensor 25 and a powerhop detection on/off switch 23. The ECU 22 also communicates with a hydraulic control valve 27 which controls a conventional hydraulic valve 29.

A transmission control unit (TCU) 32 controls the transmission 14, is coupled to the ECU 22, and receives a gear select signal from a gear select unit (not shown), such as such as described in U.S. Pat. No. 5,406,860.

Figures 2, 2A, 2B:
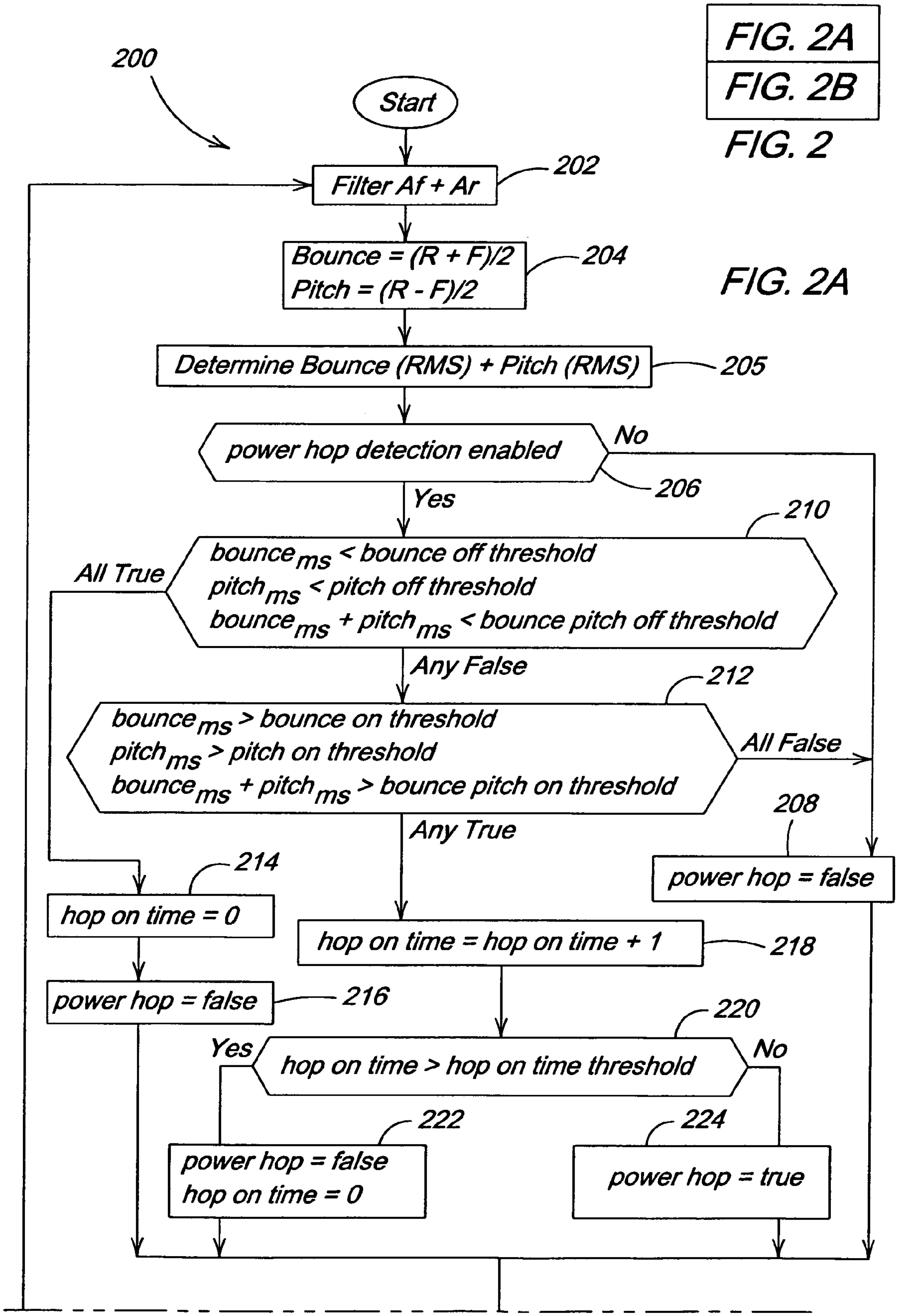
FIGS. 2A and 2B are comprise a flow chart illustrating an algorithm executed by the ECU of FIG. 1.
Figure 2B:
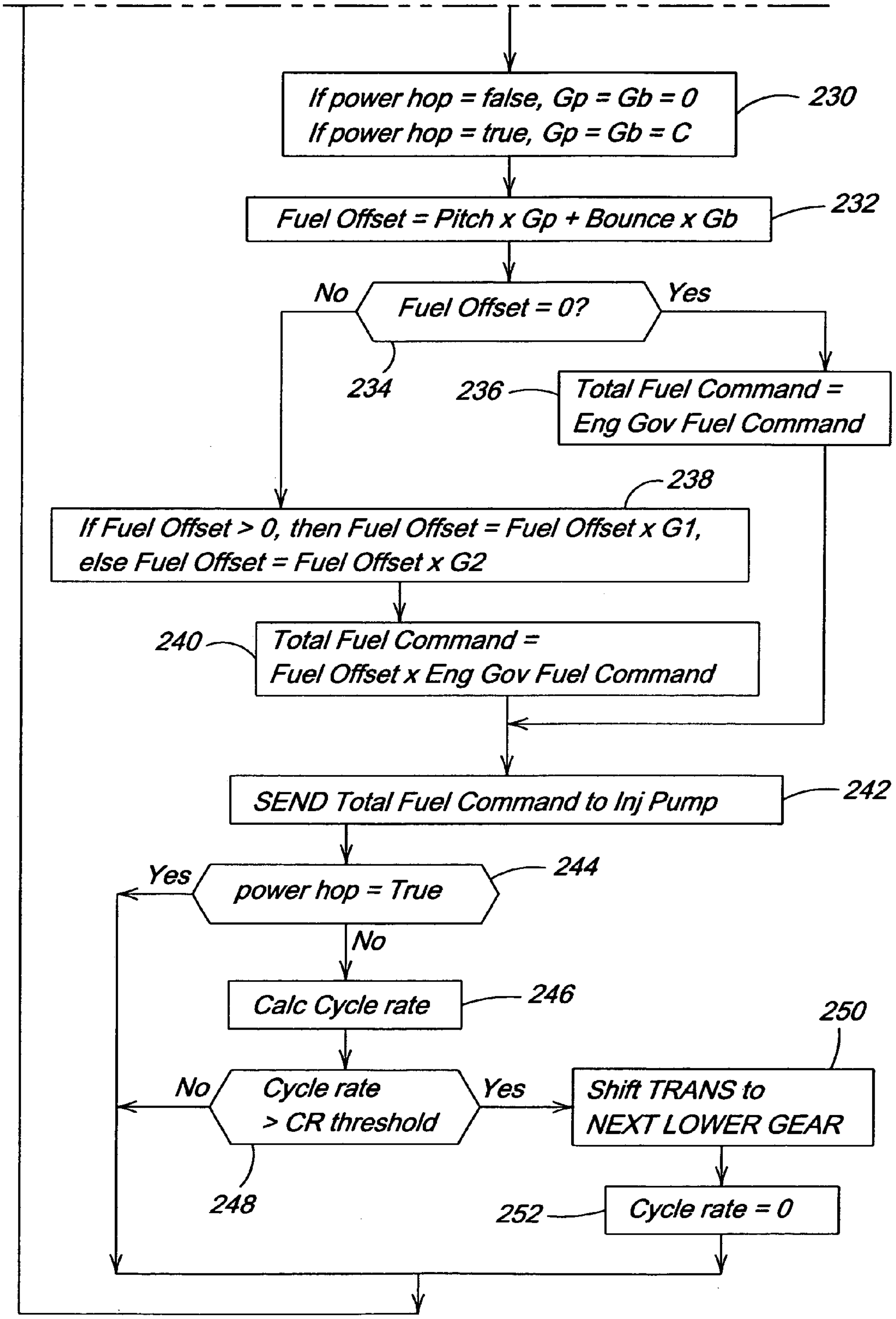

Referring to FIGS. 2A and 2B, the ECU 22 repeatedly executes an algorithm 200. The conversion of this flow chart into a standard language for implementing the algorithm described by the flow chart in a digital computer or microprocessor, will be evident to one with ordinary skill in the art. Referring now to FIG. 2A, algorithm 200 begins at step 202 which filters the acceleration signals Af and Ar with high pass software filter to remove the 1 g bias caused by the earth's gravity and to generated front and rear filtered acceleration values F and R. Step 204 calculates bounce and pitch acceleration values from values F and R as follows:

$$\text{Bounce}=(R+F)/2 \text{ and } \text{Pitch}=(R-F)/2.$$

Step 205 converts the bounce and pitch acceleration values to RMS values Bounce(RMS) and Pitch(RMS) for at least one period of the vehicle bounce frequency. For example, the bounce natural frequency of a large agricultural tractor is approximately 2 Hz. It should be understood that power hop may consist of pure pitch, pure bounce or a combination thereof.

Step 206 determines whether or not a power hop detection enable flag is set. Preferably, this flag is set when the following conditions are satisfied: engine power is greater than an engine power threshold, the throttle position is at a max throttle position, a transmission differential lock (not shown) is engaged, the transmission 14 is in a forward gear and the tractor speed is between a minimum speed threshold and a maximum speed threshold, and switch 23 is on. The various thresholds are experimentally determined for each type of tractor. If power hop detection is enabled, then step 206 directs the algorithm to step 210, else to step 208 which sets a power hop flag=false and directs control to step 230.

Step 210 determines if:

Bounce(RMS)<Bounce off threshold,

Pitch(RMS)<Pitch off threshold, and

Bounce(RMS)+Pitch(RMS)<Bounce pitch off threshold.

If all these conditions are true step 210 directs control to step 214, else to step 212.

Step 212 determines if:

Bounce(RMS)>Bounce off threshold,

Pitch(RMS)>Pitch off threshold, and

Bounce(RMS)+Pitch(RMS)>Bounce pitch off threshold.

If any of these conditions are true, then the algorithm proceeds to step 218, else if all are false, to step 208.

Step 214 sets a hop on time value=zero. After step 214, step 216 sets the power hop flag=false and directs control to step 230.

Returning to step 218, step 218 sets the hop on time value=hop on time value plus 1 and directs control to step 220.

In step 220, if the hop on time value is greater than a hop on time threshold, the algorithm proceeds to step 222, else to step 224.

Step 222 sets power hop flag=false and sets hop on time=zero, then directs control to step 230.

Step 224 sets power hop flag=true, then directs control to step 230.

In step 230, if the power hop flag is false, step 230 sets a pair of gain values Gp=Gb=zero, and if power hop flag is true, sets Gp=Gb=C, where C is a predetermined constant. After step 230, the algorithm proceeds to step 232.

Step 232 calculates a Fuel Offset value where Fuel Offset=(Pitch×Gp)+(Bounce×Gb).

If Fuel Offset equals zero, then step 234 directs control to step 236. Step 236 sets Total Fuel Command=Engine Governor Fuel Command, where Engine Governor Fuel Command is the normal fuel command generated by the ECU 22, and then directs control to step 242.

If, instep 234, Fuel Offset is not equal to zero, then step 234 directs control to step 238. Step 238, if Fuel Offset is greater than zero, sets the Fuel Offset=Fuel Offset×G1, where G1 is a first predetermined fuel offset gain value. If Fuel Offset is less than zero, then Fuel Offset=Fuel Offset× G2, where G2 is a second predetermined fuel offset gain value which is preferably greater than G1. This results in an unsymmetrical Fuel Offset value, because the positive gain G1 is less than the negative gain G2.

Then, in step 240 a Total Fuel command value is calculated as follows:

Total Fuel Command=Fuel Offset×Engine Governor Fuel Command, where Engine Governor Fuel Command is the normal fuel command generated by the ECU 22.

Next, step 242 sends the Total Fuel Command (from either step 236 or 240) to the injector pump 20 so that the amount of fuel supplied to the engine 12 is adjusted accordingly.

Next, step 244 directs the algorithm back to step 202 if the power hop flag is true, else to step 246.

In order to determine if the tractor's steady state power level is to high, steps 246 and 248 calculate and monitor a cycle rate value of the fuel control algorithm. The cycle rate is calculated in step 246 by counting how often the power hop flag transitions from false to true over a fixed period of time. In step 248, if cycle rate exceeds an experimentally determined cycle rate threshold, the vehicle power level is too high for stable traction, and step 250 shifts the transmission gear ratio to the next lower gear ratio. As a result of step 244, this adjustment is made when the fuel control algorithm is off (power hop=false). The ECU sends a command message across the tractor electronic communication bus (CCD or CAN) for the transmission control unit (TCU) to shift the transmission (power shift or IVT) to a higher gear ratio (or lower gear number).

When a tractor is in a pulling/loaded condition, the calculated RMS values of bounce and pitch provide a measurement of the level of power hop the vehicle is experiencing. The present invention defines a tractor as being in power hop condition when any of the RMS pitch and bounce accelerations exceed experimentally determined thresholds for a specified period of time (hop on time threshold). The present invention defines a tractor as being in stable traction condition when all of the values of the RMS pitch and bounce accelerations are below the experimentally determined thresholds for a specified period of time (hop off time threshold).

It should be noted that a negative Fuel Offset value from step 238 causes the power level of the engine 12 to be reduced, thus reducing or eliminating the pitch and bounce accelerations and putting the tractor 10 back into a stable traction condition. The dynamic Fuel Offset value also helps to break up the bounce and pitch accelerations as the tractor returns to stable traction. Normally, when power hop occurs the engine will be operating on the rated torque curve (max power). In that condition only a small amount of additional fuel can be added before the absolute max torque curve of the engine is reached, and exceeding this fuel level can damage the engine and violates EPA regulations. Whereas, to reduce hop and bounce the amount of fuel can reduced by a larger amount without encountering such problems. Therefore, the Fuel Offset is unsymmetrical about a zero value, and the positive gain G1 is less than the negative gain G2.

When the tractor is experiencing power hop, the by gains Gb and Gp respectively. The resulting signals are summed and acted upon by a bilinear gain function (step 238). The output from the bilinear gain is summed with the engine governor (speed control) fuel command to form a total engine fuel command. By this approach, dynamic fuel commands with their associated engine torque are generated in a way that tends to cancel the power hop bounce and pitch dynamic accelerations. The bilinear gain function applies a low gain value to positive input signals, and a large gain to negative input signals. Since power hop bounce and pitch acceleration signals are symmetrical and centered about zero, the average value from the bilinear gain function is a negative fuel command. When this fuel command is summed with the engine governor fuel command, the total engine fuel command is reduced causing the tractor velocity to decrease thus lowering the traction force. The result is a system which controls both vehicle bouncing and vehicle pitching in an agricultural tractor operating at low speed and heavy load conditions.

While the present invention has been described in conjunction with a specific embodiment, it is understood that many alternatives, modifications and variations will be apparent to those skilled in the art in light of the foregoing description. For example, the road lope control functions could be implemented by algorithms executed by a digital computer or microprocessor as part of an engine control unit. Accordingly, this invention is intended to embrace all such alternatives, modifications and variations which fall within the spirit and scope of the appended claims.

The invention claimed is:

1. A method for controlling pitching and bouncing of a vehicle having an engine driving wheels through a transmission, and having a fuel control unit for supplying a variable amount of fuel to the engine in response to fuel control signals generated by an engine control unit, the method comprising:

generating a front acceleration signal;

generating a rear acceleration signal;

generating a pitch signal as a function of the front and rear acceleration signals;

generating a bounce signal as a function of the front and rear acceleration signals; and modifying fuel delivered to the engine as a function of the pitch and bounce signals.

2. The method of claim 1, wherein:

the pitch signal is proportional to a difference between the front and rear acceleration signals.

3. The method of claim 1, wherein:

the bounce signal is proportional to a sum of the front and rear acceleration signals.

4. The method of claim 1, wherein:

the pitch and bounce signals are converted to RMS pitch and bounce values; and fuel delivered to the engine is modified as a function of the RMS pitch and bounce values.

5. The method of claim 4, further comprising:

comparing RMS pitch and bounce values to thresholds; and if any of the RMS pitch and bounce values exceed the thresholds for at least a specified period of time, modifying fuel delivered to the engine as a function of the RMS pitch and bounce values.

6. The method of claim 4, further comprising:

comparing RMS pitch and bounce values to thresholds; and if all of the RMS pitch and bounce values are below the thresholds for at least a specified period of time, preventing modifying fuel delivered to the engine as a function of the RMS pitch and bounce values.

7. The method of claim 4, further comprising:

comparing RMS pitch and bounce values to thresholds;

if any of the RMS pitch and bounce values exceed the thresholds for at least a specified period of time, modifying fuel delivered to the engine as a function of the RMS pitch and bounce values; and if all of the RMS pitch and bounce values are below the thresholds for at least a specified period of time, preventing modifying fuel delivered to the engine as a function of the RMS pitch and bounce values.

8. The method of claim 1, further comprising:

generating a fuel offset value as a function of the pitch and bounce signals;

if the fuel offset value is greater than zero, setting a modified fuel offset value equal to the fuel offset value multiplied by a gain G1;

if the fuel offset value is less than zero, setting a modified fuel offset value equal to the fuel offset value multiplied by a gain G2, wherein G2 is larger than G1; and modifying fuel delivered to the engine as a function of the a modified fuel offset value.

9. A method for controlling pitching and bouncing of a vehicle having an engine driving wheels through a transmission, and having a fuel control unit for supplying a variable amount of fuel to the engine in response to fuel control signals generated by an engine control unit, the method comprising:

generating a pitch signal representing pitching of the vehicle;

generating a bounce signal representing bouncing of the vehicle; and modifying fuel delivered to the engine as a function of the pitch and bounce signals.

10. The method of claim 9, further comprising:

generating a front acceleration signal Af;

generating a rear acceleration signal Ar;

generating the pitch signal as a function of the front and rear acceleration signals;

generating the bounce signal as a function of the front and rear acceleration signals.

11. The method of claim 10, wherein:

the pitch signal is proportional to a difference between the front and rear acceleration signals.

12. The method of claim 10, wherein:

the bounce signal is proportional to a sum of the front and rear acceleration signals.

13. The method of claim 9, wherein:

the pitch and bounce signals are converted to RMS pitch and bounce values; and fuel delivered to the engine is modified as a function of the RMS pitch and bounce values.

14. The method of claim 9, further comprising:

generating a fuel offset value as a function of the pitch and bounce signals;

if the fuel offset value is greater than zero, setting a modified fuel offset value equal to the fuel offset value multiplied by a gain G1;

if the fuel offset value is less than zero, setting a modified fuel offset value equal to the fuel offset value multiplied by a gain G2, wherein G2 is larger than G1; and modifying fuel delivered to the engine as a function of the a modified fuel offset value.

15. A system for controlling pitching and bouncing of a vehicle having an engine driving wheels through a transmission, and having a fuel control unit for supplying a variable amount of fuel to the engine in response to fuel control signals generated by an engine control unit, the system comprising:

a pitch signal generator for generating a pitch signal representing pitching of the vehicle;

a bounce signal generator for generating a bounce signal representing bouncing of the vehicle; and a control unit which modifies fuel delivered to the engine as a function of the pitch and bounce signals.

16. The method of claim 15, further comprising:

a front accelerometer mounted on a front portion of the vehicle for generating a front acceleration signal Af;

a rear accelerometer mounted on a rear portion of the vehicle for generating a rear acceleration signal Ar;

the control unit generating the pitch signal as a function of the front and rear acceleration signals, and generating the bounce signal as a function of the front and rear acceleration signals.

17. The system of claim 16, wherein:

the pitch signal is proportional to a difference between the front and rear acceleration signals.

18. The system of claim 16, wherein:

the bounce signal is proportional to a sum of the front and rear acceleration signals.

19. The system of claim 15, wherein:

the control unit converts the pitch and bounce signals to RMS pitch and bounce values, modifies fuel delivered to the engine as a function of the RMS pitch and bounce values.

20. The system of claim 15, wherein:

the control unit generates a fuel offset value as a function of the pitch and bounce signals;

if the fuel offset value is greater than zero, the control unit sets a modified fuel offset value equal to the fuel offset value multiplied by a gain G1;

if the fuel offset value is less than zero, the control unit sets a modified fuel offset value equal to the fuel offset value multiplied by a gain G2, wherein G2 is larger than G1; and the control unit modifies fuel delivered to the engine as a function of the modified fuel offset value.

* * * * *